Patented Sept. 6, 1927.

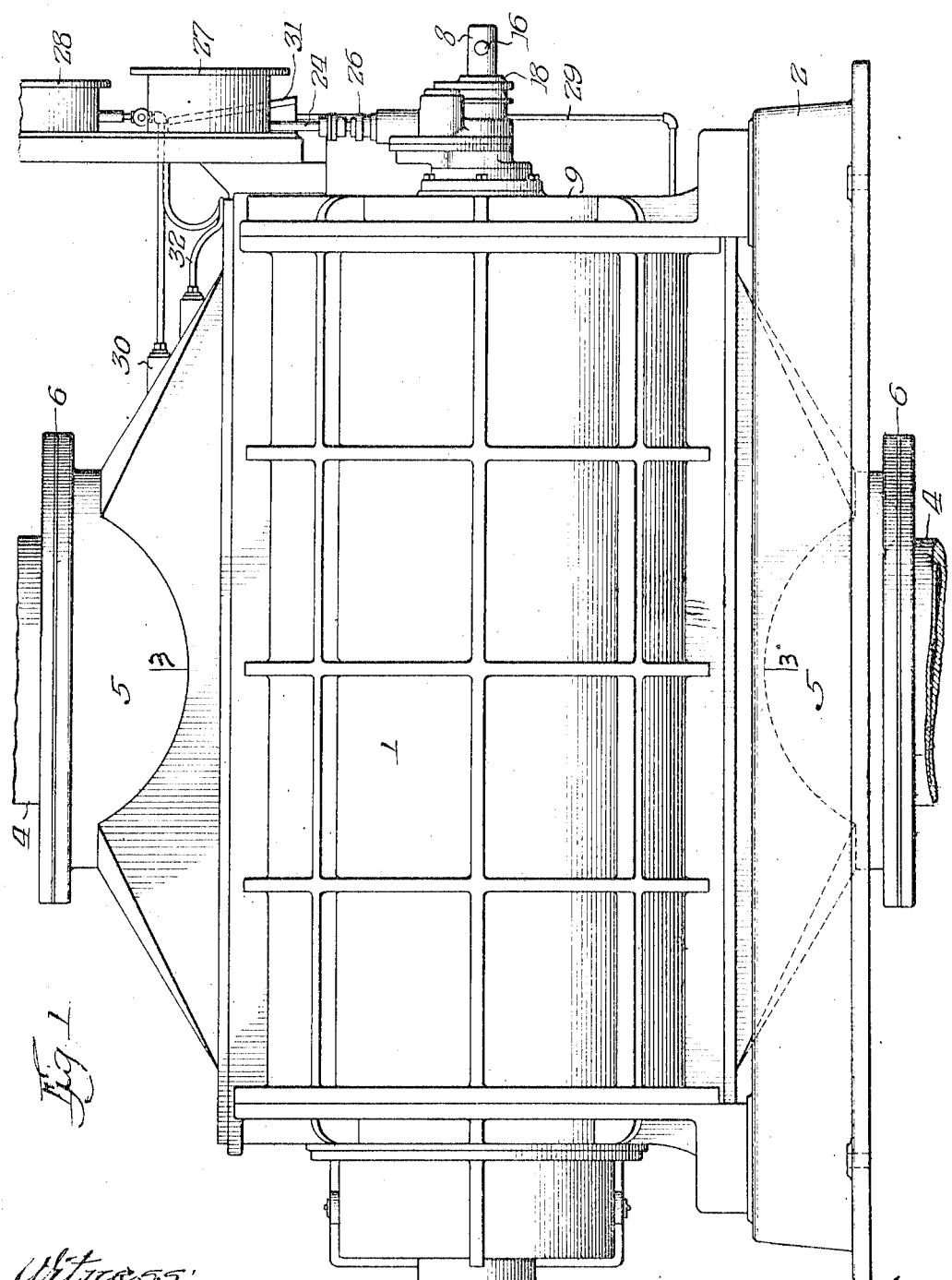

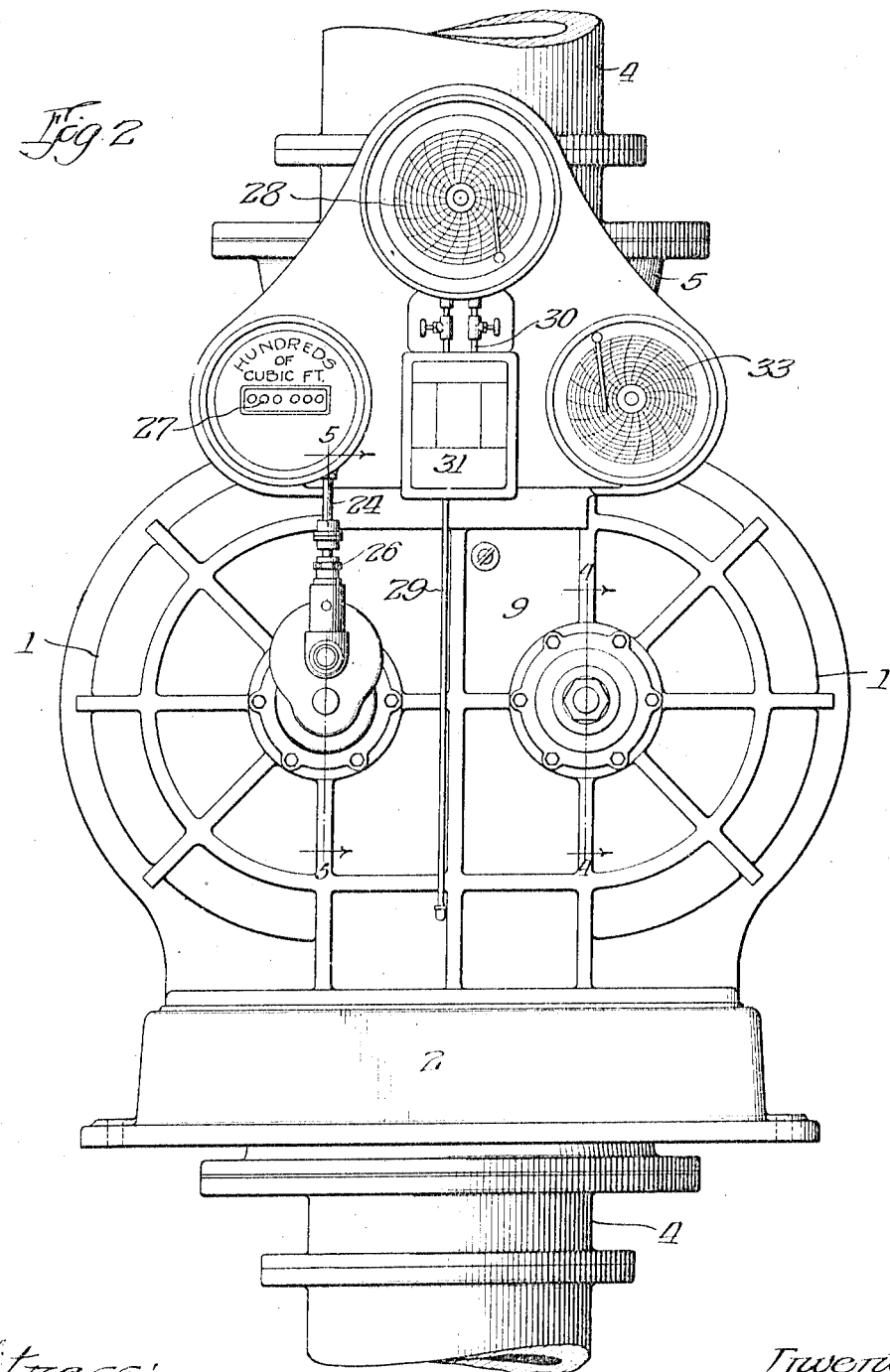

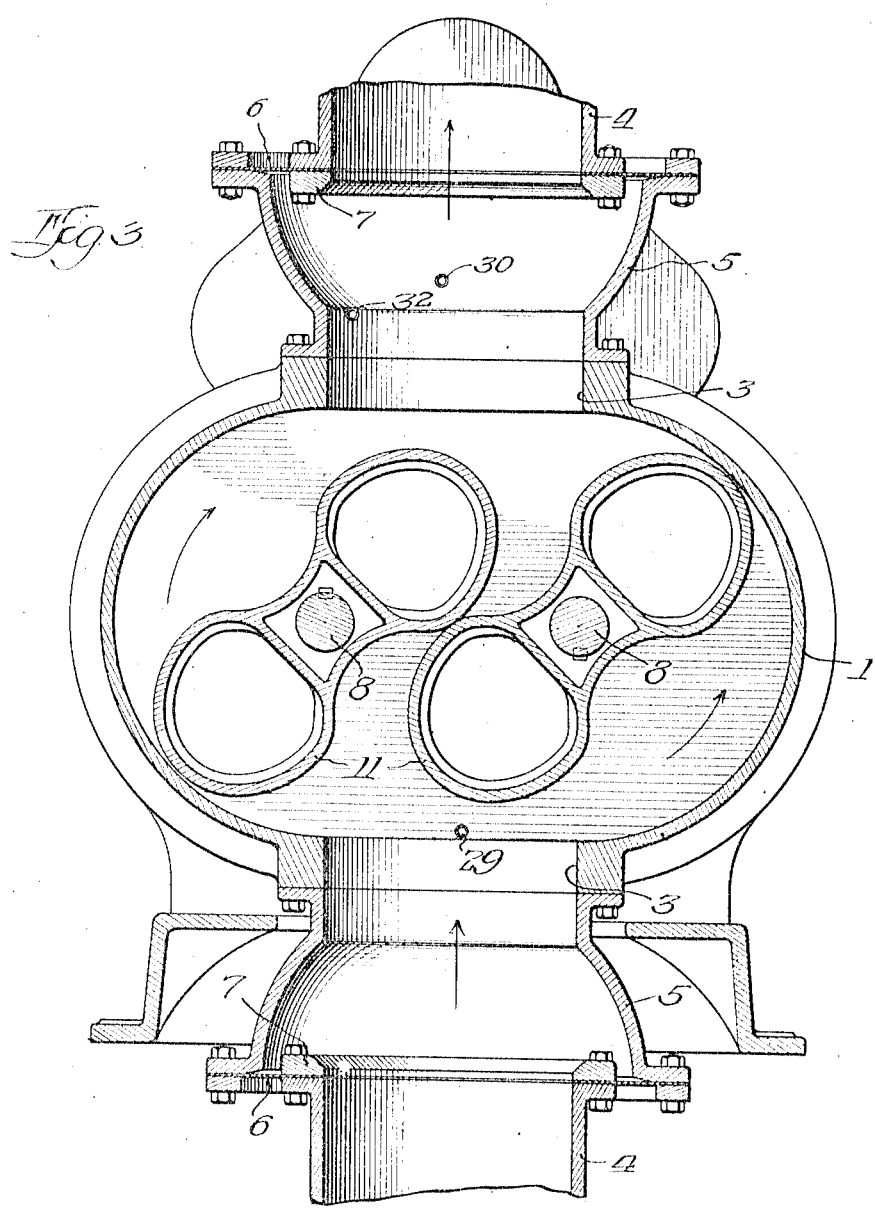

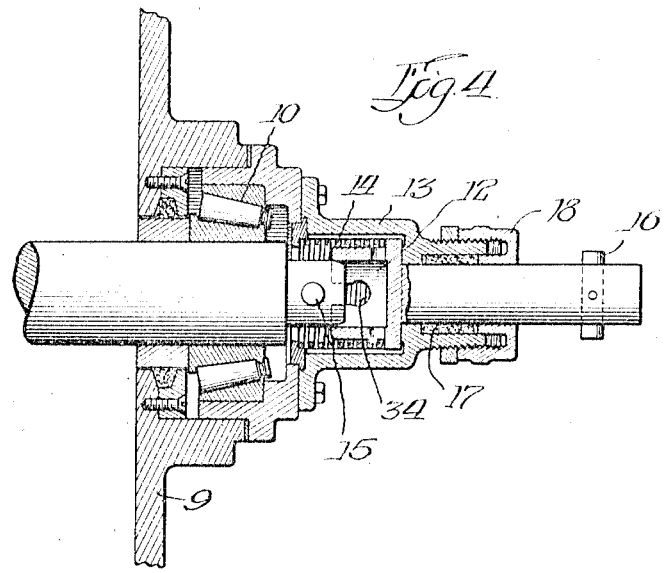
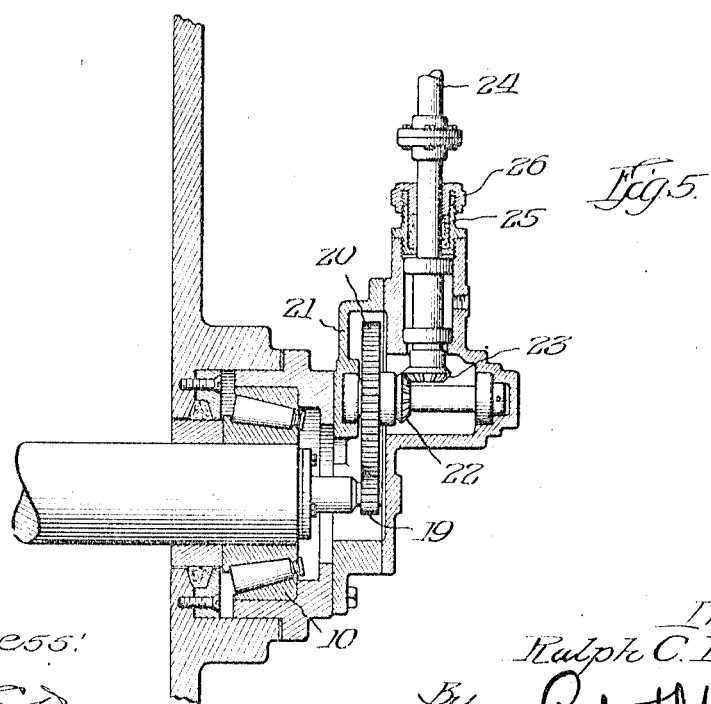

1,641,840

UNITED STATES PATENT OFFICE.

RALPH C. ENYART, OF CONNERSVILLE, INDIANA, ASSIGNOR TO THE P. H. & F. M. ROOTS COMPANY, OF CONNERSVILLE, INDIANA, A CORPORATION OF INDIANA.

FLUID METER.

Application filed March 25, 1922. Serial No. 546,656.

The present invention relates to meters for use in measuring the volume of fluid flowing through a conduit. The invention provides a meter adaptable to all conditions in which this purpose is to be accomplished, but the meter illustrated in detail in the drawings is especially designed and adapted to be used as a station meter at gas works to measure the volume of gas delivered. The meter provided by this invention is thoroughly accurate and is further especially characterized by a very notable simplicity in construction, and by economy of installation and operation.

In the drawings,—

Figure 1 is a side elevation of a meter embodying the invention.

Figure 2 is an end elevation thereof.

Figure 3 is a section on the line 3—3 in Figure 1.

Figure 4 is a section on the line 4—4 in Figure 2, and

Figure 5 is a section on the line 5—5 in Figure 2.

The meter comprises a casing 1 preferably made of cast iron and mounted on a base 2. The casing is provided at opposite sides with openings 3, one of which constitutes an inlet and the other an outlet for the flow of fluid through the meter. Pipe lines 4 communicate with the openings 3 in the casing. In order to avoid any possible distortion of the casing in connecting the pipes 4 with it, the pipes are preferably flexibly connected with the casing as illustrated in Figure 3. In this construction extensions 5 are secured to the casing surrounding the openings 3 and apertured flexible diaphragms 6 are secured against the outer faces of the extensions. The pipes 4 are secured to the flexible diaphragms by annular plates 7. The pipe communicating with the bottom of the casing may extend down through the base 2 and the floor or may be extended along the floor, in which event the base 2 will be elevated on a suitable pedestal.

A pair of parallel shafts 8 are journaled in the head plates 9 of the casing 1 and in order that the shafts may be rotated by the least possible power they are journaled in antifriction bearings 10, illustrated in the drawings as the well known Timken roller bearing. An impeller 11 extending the length of the casing 1 is keyed on each of the shafts 8 and in order that the impellers may be rotated as easily as possible they are preferably made of aluminum alloy. In the drawings the casing is shown with inlet and outlet openings at the bottom and top respectively and the impellers are shown secured to parallel shafts separated horizontally from each other. If desired the casing may be mounted so that the inlet and outlet openings are at the sides and the impeller shafts are separated vertically.

The configuration of the impellers and of the interior surface of the casing and the principle of operation by which a definite or fixed quantity or volume of air passes through the casing at each revolution of the impellers are analogous to the construction and principle of operation of the well known Roots blowers and exhausters. The impeller shafts are connected by timing gears so that the impellers rotate in accurate relation to each other. The interior surface of each half of the casing is formed on a semi-circle having the axis of the adjacent impeller shaft as its center. The width of the impeller is such that at all times one or the other of its ends is approximately in contact with the casing. The exterior surfaces of the impellers are formed on arcs of circles so that during revolution of the impellers they are at all times approximately in contact with each other.

Referring to Figure 3, assume that gas or other fluid is entering the casing at the bottom and discharging at the top, and that the impellers are revolving in the direction of the arrows. The gas cannot pass between the two impellers. Gas enters to the right of the right impeller and as the latter continues to rotate a volume of gas is trapped between the impeller and the casing at the instant the impeller is in vertical positions. As the impeller continues to rotate communication is established with the opening in the top of the casing and the previously trapped gas is permitted to escape. The volume of the space between the impeller and the casing when the impeller is in vertical position, is accurately predetermined, and this volume of gas is permitted to pass through the casing twice for each revolution of one impeller or four times for each revolution of both of the impellers. Consequently, an accurately measured quantity of gas or other fluid positively is delivered through the casing at each revolution of the impellers.

In the construction illustrated the impellers will be rotated by the force of the gas or other fluid flowing through the casing. In order to overcome the inertia of the impellers at the outset, they may, if desired, be rotated initially by a hand crank. For this purpose a supplementary shaft 12 is axially aligned with one of the impeller shafts 8 and is slidable toward the latter in a housing 13 against the compression spring 14. The inner end of the shaft 12 is hollow and slides over the end of the shaft 8 so that notches 34 formed in the shaft 12 may engage pins 15 on the shaft 8. The shafts 12 and 8 may then be initially rotated by a crank engaging the projections 16 on the shaft 12. Leakage at the end of the impeller shaft is prevented by packing 17 secured around the shaft 12 by the gland 18.

One of the impeller shafts 8 has secured at its outer end a gear 19 meshing with a gear 20 secured to a stub shaft journaled in a housing 21. A gear 22 secured on the stub shaft meshes with a gear 23 secured to a shaft 24. Leakage at the end of this impeller shaft is prevented by packing 25 secured around the shaft 24 by a gland 26.

The shaft 24 operates a counter 27 in a manner similar to the operation of an ordinary revolution counter, which is conveniently mounted on a plate at one end of the casing. Since at each revolution of the impeller shaft a definitely known volume of gas or other fluid passes through the casing, the gears 19, 20, 22 and 23 may be made with such ratios that the counter 27 will directly register hundreds of cubic feet of gas which have passed through the meter. In some instances gas will be delivered through the meter in one direction during part of the day and returned in the opposite direction at another time during the day. During the latter period the direction of rotation of the impellers and of the operating mechanism in the counter 27, will be reversed so that finally the counter will indicate the net volume of gas delivered.

In order to prevent friction between the impellers 11 and the casing 1 a slight clearance must be provided between the surfaces of the impellers and the casing. A small amount of gas will pass through this clearance space without being registered by the revolution of the impellers. The volume of gas which will slip past the impellers, however, varies solely with the specific gravity of the gas or other fluid being metered and with the difference in pressure between the inlet and outlet sides of the impellers representing the force required to rotate the impellers. In order to determine and record this difference in pressures a recording differential pressure gauge 28 of usual type is connected by pipes 29 and 30 with the inlet and outlet sides of the casing. The chart made by the recording gauge, of course, will disclose the average differential pressure over any desired length of time. A chart 31 conveniently secured to the casing is designed so as to indicate at a glance the volume of gas which will slip past the impellers in a given length of time under various differential pressures. Consequently, the slippage of gas or other fluid will be readily determined and added to the volume indicated by the counter 27, the specific gravity of the gas being dealt with in a given installation, of course, being known and taken into consideration.

The volume of gas passing through the meter under varying temperature conditions must for commercial purposes be reduced to volume at a constant temperature. For this purpose a thermometer 32 is subjected to the gas or other fluid passing through the meter and is connected with a recording instrument 33, by means of which the volume of fluid passing through the meter may be computed into volume at a constant temperature.

Having thus described my invention, what I claim as new and desire to secure by Letters Patent of the United States is:—

1. A fluid meter of the character described, comprising a casing having an inlet opening and an outlet opening therein, rotatable impellers within said casing between the inlet and outlet openings and adapted to be actuated by fluid passing through the said casing, said impellers having an operating clearance with respect to the said casing, counter mechanism operably connected to the said impellers and constructed to indicate a given quantity of flow through the said meter for each revolution of the said impellers, and mechanism for indicating the quantity of fluid passing through said operating clearance, whereby the actual quantity of fluid passing through the said meter may be determined.

2. A fluid meter of the character described, comprising a casing having an inlet opening and an outlet opening, cooperable rotatable impellers within said casing adapted to be actuated by the fluid passing therethrough, said impellers having a substantially constant operating clearance with respect to said casing, a counter mechanism operatively connected to said impellers and constructed to indicate a given quantity of flow through the said meter for each revolution of the said impellers, and mechanism comprising a recording differential pressure gauge, connections from said gauge to the inlet and the outlet side respectively of said casing, and a calibration chart associated with said differential pressure gauge, said mechanism indicating the quantity of fluid passing through said operating clearance, thereby permitting determination of the total quantity of fluid passing through said meter.

In witness whereof, I hereunto subscribe my name this 22nd day of March, 1923.

RALPH C. ENYART.